US011436218B2

(12) United States Patent
Cai et al.

(10) Patent No.: US 11,436,218 B2
(45) Date of Patent: Sep. 6, 2022

(54) TRANSACTION PROCESSING FOR A DATABASE DISTRIBUTED ACROSS AVAILABILITY ZONES

(71) Applicant: Alibaba Group Holding Limited, George Town (KY)

(72) Inventors: Le Cai, Cupertino, CA (US); Xin Jia, San Jose, CA (US); Qinyi Wu, Sunnyvale, CA (US)

(73) Assignee: Alibaba Group Holding Limited

( * ) Notice: Subject to any disclaimer, the term of this patent is extended or adjusted under 35 U.S.C. 154(b) by 400 days.

(21) Appl. No.: 16/530,350

(22) Filed: Aug. 2, 2019

(65) Prior Publication Data

US 2021/0034605 A1 Feb. 4, 2021

(51) Int. Cl.
*G06F 16/23* (2019.01)
*G06F 1/14* (2006.01)
*G06F 16/27* (2019.01)

(52) U.S. Cl.
CPC ............ *G06F 16/2379* (2019.01); *G06F 1/14* (2013.01); *G06F 16/27* (2019.01)

(58) Field of Classification Search
CPC ......... G06F 16/2379; G06F 16/27; G06F 1/14
See application file for complete search history.

(56) References Cited

U.S. PATENT DOCUMENTS

| 8,554,951 | B2 | 10/2013 | Barton | |
| 8,712,975 | B2 | 4/2014 | Barton | |
| 9,116,629 | B2 | 8/2015 | Barton | |
| 9,261,898 | B1 | 2/2016 | Allen | |
| 10,423,493 | B1 | 9/2019 | Vig | |
| 2007/0250672 | A1* | 10/2007 | Stroberger | G06F 11/2064 711/162 |
| 2012/0102006 | A1* | 4/2012 | Larson | G06F 16/275 707/703 |
| 2017/0213214 | A1* | 7/2017 | Senci | H04L 69/22 |

(Continued)

OTHER PUBLICATIONS

Roohitavaf et al., "Srssion Guarantees with Raft and Hybrid Logical Clocks", Aug. 16, 2018, ACM, all pages (Year: 2018).*

(Continued)

*Primary Examiner* — Tamara T Kyle
*Assistant Examiner* — Lahcen Ennaji
(74) *Attorney, Agent, or Firm* — Van Pelt, Yi & James LLP

(57) ABSTRACT

Transaction processing for a database distributed across availability zones is disclosed, including: determining that a transaction comprising a set of one or more statements is to be executed on a plurality of database servers across at least two availability zones, wherein each availability zone is associated with a respective hybrid logical clock (HLC)-based centralized time service; causing the set of one or more statements to execute on the plurality of database servers across the at least two availability zones; obtaining a plurality of HLC-based prepare timestamps from the plurality of database servers across the at least two availability zones; selecting a maximum HLC-based prepare timestamp to use as a commit timestamp associated with the transaction; and determining whether to return a commit result corresponding to the transaction after a time delay that is determined based at least in part on a predetermined time skew.

17 Claims, 10 Drawing Sheets

(56) References Cited

U.S. PATENT DOCUMENTS

2019/0171763 A1\* 6/2019 Cai .................. G06F 16/951
2021/0042284 A1\* 2/2021 Kanthak ............ G06F 16/2358

OTHER PUBLICATIONS

Spirovska et al. "PaRiS: Causally Consistent Transactions with Non-blocking Reads and Partial Replication", 2019, IEEE, all pages (Year: 2019).\*
Du et al. "Clock-SI: Snapshot Isolation for Partitioned Data Stores Using Loosly Synchronized Clocks", 2013, IEEE, all pages (Year: 2013).\*
Moohivaf et al. "CausalSpartanX: Causal Consistency and Non-Blocking Read-only Transactions", 2018, ACM, all pages. (Year: 2018).\*
Kulkarni et al., Logical Physical Clocks and Consistent Snapshots in Globally Distributed Databases, 2014.

\* cited by examiner

500 →

┌─────────────────────────────────────────────────────┐
│ Determine that a transaction comprising a set of one or more │ — 502
│ statements is to be executed on a plurality of database servers │
│ across at least two availability zones, wherein each availability zone │
│ is associated with a respective hybrid logical clock (HLC)-based │
│ centralized time service │
└─────────────────────────────────────────────────────┘
                            ↓
┌─────────────────────────────────────────────────────┐
│ Cause the set of one or more statements to execute on the plurality │ — 504
│ of database servers across the at least two availability zones │
└─────────────────────────────────────────────────────┘
                            ↓
┌─────────────────────────────────────────────────────┐
│ Obtain a plurality of HLC-based prepare timestamps from the plurality │ — 506
│ of database servers across the at least two availability zones │
└─────────────────────────────────────────────────────┘
                            ↓
┌─────────────────────────────────────────────────────┐
│ Select a maximum HLC-based prepare timestamp to use as a │ — 508
│ commit timestamp associated with the transaction │
└─────────────────────────────────────────────────────┘
                            ↓
┌─────────────────────────────────────────────────────┐
│ Determine whether to return a commit result corresponding to the │ — 510
│ transaction after a time delay that is determined based at least in part │
│ on a predetermined time skew │
└─────────────────────────────────────────────────────┘

TRANSACTION PROCESSING FOR A DATABASE DISTRIBUTED ACROSS AVAILABILITY ZONES

BACKGROUND OF THE INVENTION

Distributed databases resolve the issue of scalability of standalone databases, allowing the computation and storage capacity of database systems to be flexibly increased without subjecting them to the limitations of a single server. In a distributed scheme, databases may be distributed to different physical locations to ensure high availability. If there was only one global lock, then its physical location may be proximate to some database instances but far from some other database instances. The network latency associated with acquiring the clock that would be experienced by the further database instances would be high and could detrimentally affect the throughput of those database instances. If there were multiple clocks located at different physical locations, then the clocks would need to be periodically synchronized to curb the negative effects of the clocks' natural deviations from each other. While clock synchronization protocols exist, a non-zero clock skew is still present, which may cause database issued timestamps with respect to transaction commits to be inconsistent with the transaction's commits in absolute time. The discrepancy between the sequence of transaction commits as indicated by database issued timestamps and the sequence of the transaction commits in absolute time may cause inconsistent reads of database data, which may ultimately cause problems for the applications that perform such reads.

BRIEF DESCRIPTION OF THE DRAWINGS

Various embodiments of the invention are disclosed in the following detailed description and the accompanying drawings.

FIG. 5 is a flow diagram showing an embodiment of a process for processing a transaction at a database that is distributed across availability zones.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
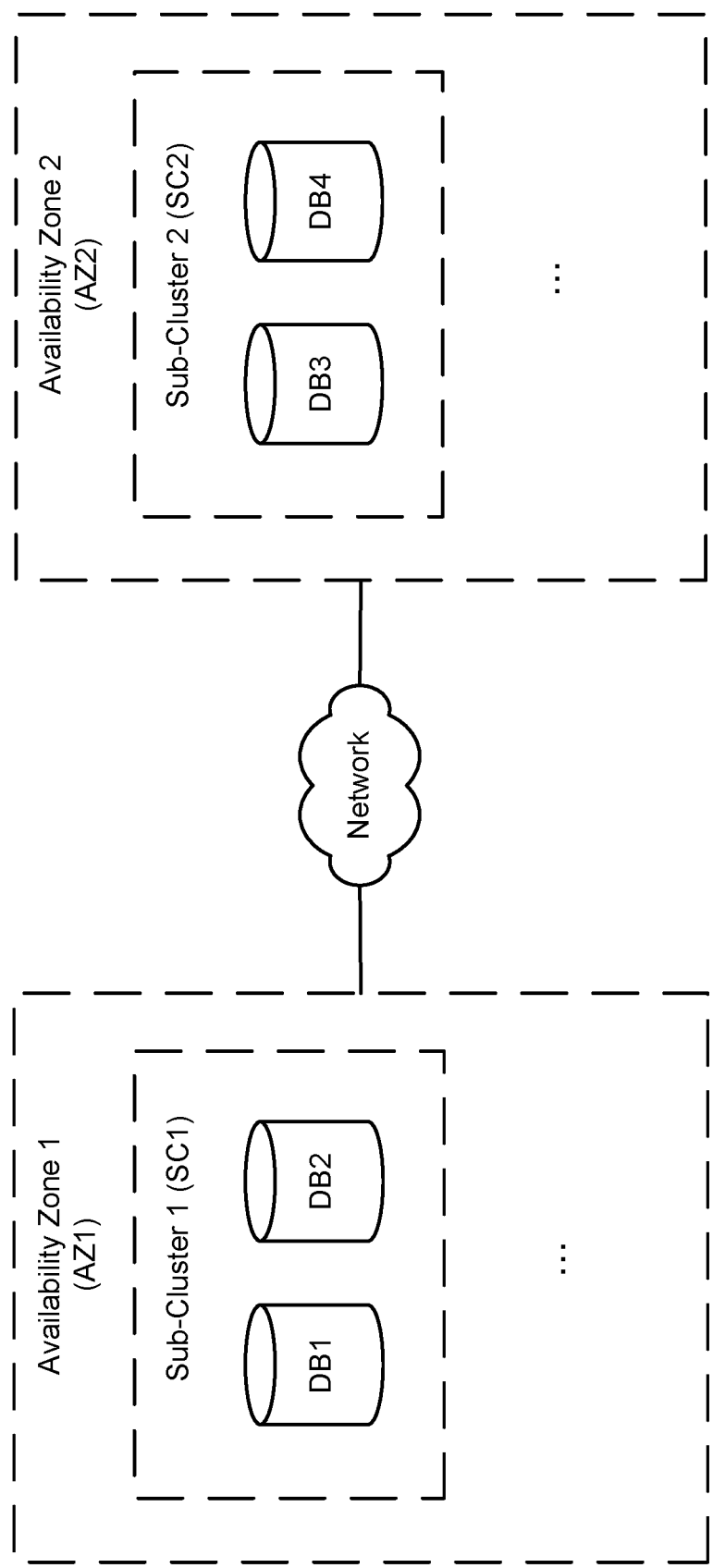
FIG. 1 is a diagram showing a scheme of distributed databases.

FIG. 1 is a diagram showing a scheme of distributed databases. As shown in the example of FIG. 1, database instances (e.g., DB1, DB2, DB3, and DB4) (which are implemented on respective database servers) are distributed across two availability zones, Availability Zone 1 (AZ1) and Availability Zone 2 (AZ2). In various embodiments, an "availability zone" comprises a group of database servers that share power supplies and network systems. Two availability zones may or may not be located in the same physical area. Due to each availability zone having its independent power supplies and network systems, when a problem arises in one availability zone, it will not affect database instances in other availability zones. The network latency between availability zones is generally within 5 milliseconds (ms). As shown in the example of FIG. 1, each availability zone may have one or more logical sub-groups of database servers within a distributed database system. Such logical sub-groups of database servers are called "sub-clusters." In FIG. 1, AZ1 includes Sub-Cluster 1 (SC1), which includes two database servers, DB1 and DB2. AZ2 includes Sub-Cluster 2 (SC2), which includes two database servers, DB3 and DB4. Database servers including at least DB1, DB2, DB3, and DB4 are deployed on different servers but are presented to users as having the characteristics of a single database. A transaction to read data and/or to update data, for example, at the distributed database may be performed on one or more database servers, which may be located in one or more availability zones. A transaction comprises a function used by the database to ensure atomicity and isolation of operations.

From the perspective of high availability, distributed databases can be scaled to multiple sub-clusters, thereby ensuring high database availability in the event of a sub-cluster failure, providing local data access to applications and enhancing the user experience. Scaling to multiple sub-clusters also presents challenges to distributed databases, such as the global event sequence required for transaction and concurrency management. In a single database server scenario, this sequence is simply provided by the server's local physical clock; when one sub-cluster is deployed, one database server can be selected to implement the global physical clock service for all database instances in the sub-cluster.

For the purpose of high availability, distributed database instances are often deployed across multiple availability zones, which can also help to ensure low-latency access, a certain level of performance scalability, and load balancing. If a global physical clock is still used for deployments across availability zones, for database instances located in availability zones other than the one where the timing service is located, the cost of acquiring the physical clock (which is sometimes referred to "network latency") is relatively high. If the global physical clock is not in the local availability zone, data access for most transactions may be limited to database instances within the local availability zone, in which case the cost of acquiring the physical clock is too great for most transactions, greatly impacting high-throughput and low-latency transactional loads.

Alternative to using one global physical clock for database instances that are distributed across multiple availability zones, multiple physical clocks may be implemented across the availability zones. Natural deviations would exist between the physical clock systems, and these deviations will continually increase over time. In order to ensure that the physical clock deviations (which are also sometimes referred to as "clock skews") between different clocks are minimized, GPS, atomic clocks, and other protocols (such as Network Time Protocol "NTP") are used to synchronize the timing of all the different instances of physical clocks across the availability zones. However, given that the physical clock skew among the different clocks would be nonzero, the clock skew would need to be addressed when different transactions are performed, close in time, at the distributed database.

Embodiments of transaction processing at a database that is distributed across availability zones are described herein. A transaction comprising a set of one or more statements is determined to be executed on a plurality of database servers across at least two availability zones. In various embodiments, each availability zone includes at least one corresponding centralized time service (which is sometimes referred to as "CTS") that implements a hybrid logical clock (which is sometimes referred to as "HLC") for the database servers within that zone. In various embodiments, the transaction is received at a database server that is configured to serve as the coordinator for processing the transaction. The set of one or more statements is caused to be executed on the plurality of database servers across the at least two availability zones. The coordinator database server resides in one availability zone and therefore relies on a HLC that is local to that availability zone to determine time, as do other database servers that are located within the same availability zone. A HLC-based finish timestamp associated with an execution of a last statement of the set of one or more statements is obtained. A two-phase commit is performed. The two-phase commit includes obtaining a plurality of HLC-based preparation timestamps from the plurality of database servers across the at least two availability zones. The two-phase commit also includes selecting the maximum HLC-based preparation timestamp to use as the commit timestamp associated with the transaction. The two-phase commit further includes causing the plurality of database servers across the at least two availability zones to commit execution results associated with the set of one or more statements using the commit timestamp. It is determined that a difference between the HLC-based finish timestamp associated with the execution of the last statement and a current local HLC time is equal to or less than a predetermined time skew. In response to a determination that the difference is equal to or less than the predetermined time skew, a commit result corresponding to the transaction is returned after a time delay that is determined based at least in part on the predetermined time skew. In various embodiments, the "predetermined time skew" is a configurable value. In some embodiments, the predetermined time skew is configured to be a value that is greater than the network latency across availability zones (e.g., 5 ms). In some embodiments, the predetermined time skew is set to be the maximum "clock skew" between the HLC time systems across the plurality of availability zones (e.g., 10 ms).

As will be described in further detail below, in accordance with various embodiments, one centralized time service clock is used for transactions that can be processed within a sub-cluster of a single availability zone while the hybrid logical clock protocol is used to enforce serialization across centralized time service clocks belonging to sub-clusters in different availability zones for transactions that are processed across those availability zones. Furthermore, a time delay is applied before returning a commit result of a transaction that is processed within a single availability zone or across multiple availability zones (such transactions are sometimes referred to as "cross-availability zone" or "cross-AZ" transactions) to the source of the transaction (e.g., an application), when appropriate, to ensure that the network latency in returning the transaction commit result far exceeds the clock skew. In various embodiments, a "cross-availability zone" transaction comprises a transaction whose one or more statements are executed in at least a database server that is located within a first availability zone and a database server that is located within a second availability zone. In some embodiments, a "cross-availability zone" transaction comprises a transaction whose at least one statement is executed at a database server that is located in an availability zone that is different than the availability zone in which the coordinator database is located. In various embodiments, the transaction commit result comprises a message that indicates that the transaction had committed and also includes the commit timestamp. Using these techniques, transaction processing successfully supports external consistency within individual availability zones and supports causal consistency across availability zones. External consistency guarantees that a transaction will always receive current information. The actual time order in which transactions complete defines a unique serial schedule, which can be referred to as the external schedule. A system is said to provide external consistency if it guarantees that the schedule it will use to process a set of transactions is equivalent to its external schedule. Causal consistency can be defined as a model that captures the causal relationships between operations in the system and guarantees that each process can observe those causally related operations in common causal order. In other words, all processes in the system agree on the order of the causally related operations (e.g., transactions). Various embodiments described herein enable database distribution across availability zones, but still support the processing of transactions within individual availability zones with high-throughput and low-latency.

Figure 2:
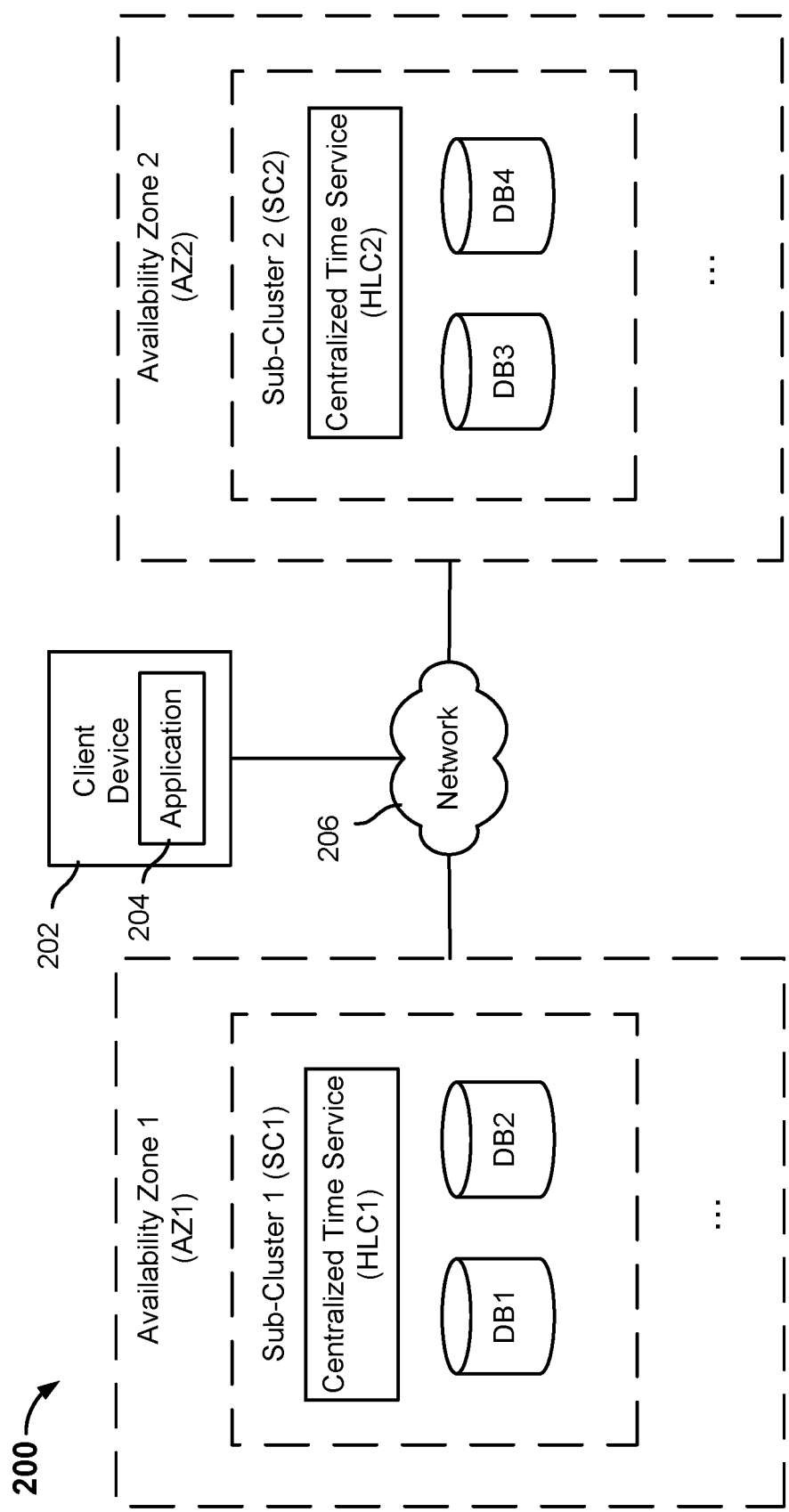
FIG. 2 is a diagram of an embodiment of a system for transaction processing at a database that is distributed across availability zones.

FIG. 2 is a diagram of an embodiment of a system for transaction processing at a database that is distributed across availability zones.

Figure 3:
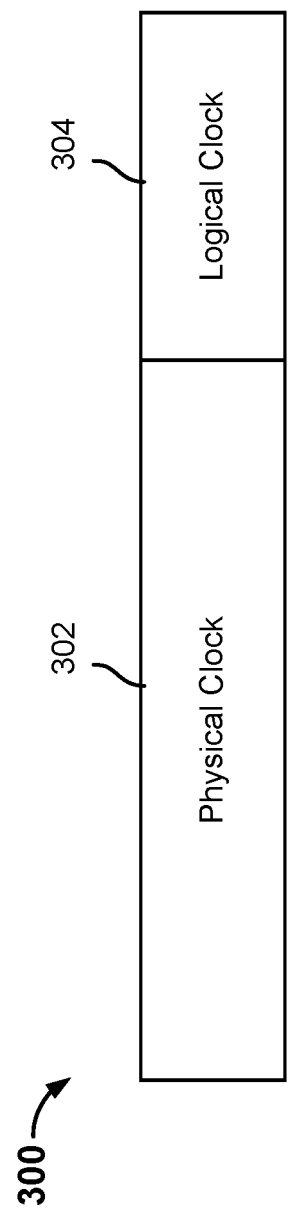
FIG. 3 is a diagram showing an embodiment of a HLC.

System 200 includes multiple availability zones, including Availability Zone (AZ1) and Availability Zone (AZ2). Availability Zone 1 includes database servers DB1 and DB2 that are included in logical grouping Sub-Cluster 1 (SC1) and Availability Zone 2 includes database servers DB3 and DB4 that are included in logical grouping Sub-Cluster 2 (SC2). At least database servers DB1, DB2, DB3, and DB4 may implement one distributed database from the perspective of a user. Each of Sub-Cluster 1 and Sub-Cluster 2 includes a corresponding Centralized Time Service (CTS) that respectively generates hybrid logical clock 1 (HLC1) and hybrid logical clock 2 (HLC2). In various embodiments, the HLC that is generated by a CTS is a combination of a physical clock that increments as time elapses and a logical clock that increments when events occur. When the physical clock portion of the HLC goes up, the logical clock portion of the HLC resets to zero. FIG. 3, below, shows an embodiment of a HLC.

Returning to FIG. 2, database servers DB1 and DB2 of Sub-Cluster 1 would obtain times from HLC1, which serves as a CTS to Sub-Cluster 1, and database servers DB3 and DB4 would obtain times from HLC2, which serves as a CTS to Sub-Cluster 2. Given that HLC1 is located in the same sub-cluster as DB1 and DB2, DB1 and DB2 can acquire the current time from HLC1 with minimal latency. Similarly, given that HLC2 is located in the same sub-cluster as DB3 and DB4, DB3 and DB4 can acquire the current time from HLC2 with minimal latency. The times kept by at least HLC1 and HLC2 as well as HLCs from other sub-clusters of Availability Zones 1 and 2 or from other availability zones are synchronized by a clock synchronization protocol (e.g., NTP) to reduce the clock skew between the clocks. However, a clock skew up to a maximum value (e.g., 10 ms) likely still exists between the HLCs. HLC1 provides an incremental time sequence for DB1 and DB2 while HLC2 provides an incremental time sequence for DB3 and DB4.

In some embodiments, the maximum clock skew between HLCs located in different availability zones is on a similar order or comparable to the network latency between different availability zones. For example, the maximum clock skew between HLCs is 10 ms while the maximum network latency between different availability zones is 5 ms. In various embodiments, the "network latency between different availability zones" refers to the length of time that it takes for data to be sent from one availability zone to another availability zone. For example, it will take up to the maximum network latency (e.g., 5 ms) for a message to travel over network 206 from one database server in Availability Zone 1 to another database server in Availability Zone 2. For example, network 206 may be implemented using high-speed data and/or telecommunication networks.

Availability Zone 1 and Availability Zone 2 are each configured to rely on an independent set of power supplies and network systems such that disruptions to Availability Zone 1's power and/or network systems will not detrimentally affect database servers located in Availability Zone 2. Availability Zone 1 and Availability Zone 2 may or may not be located in different physical locations.

Transactions to the database that are distributed across at least Availability Zones 1 and 2 may originate from application 204 executing at client device 202. In various embodiments, a "transaction" comprises an atomic operation that includes one or more statements to be executed across one or more database servers in a distributed database. In some embodiments, each database server on which a transaction is to be executed, at least in part, is sometimes referred to as a "participating database server." For example, a "statement" that is part of a transaction comprises an operation or a command that is to be applied on a database. For example, statements may comprise read operations, operations to write new data, operations to delete existing data stored at the database, and/or operations to update existing data at the database. For example, the statements may be Structured Query Language (SQL) statements/commands.

In various embodiments, application 204 is configured to generate a session and within the session, send one or more transactions to the database distributed across Availability Zones 1 and 2. A transaction that is issued by a requestor (e.g., application 204) to the distributed database is received at and then processed by a transaction coordinator. In various embodiments, the transaction coordinator is a participating database server in the distributed database. It is determined (e.g., by the coordinator) whether the set of statements that is included in the transactions is to be executed by database servers located in a single availability zone or across multiple availability zones. Whether the set of statements that is included in the transactions is to be executed by database servers located in a single availability zone or across multiple availability zones may be determined, for example, based on the hint information that is sent by application 204 or by a two-phase commit protocol that is used by the coordinator. In some embodiments, hint information that is provided by an application can specify whether the transaction or the session will only operate on the data in one sub-cluster or one availability zone. For example, the coordinator is selected by the two-phase commit protocol that is being used by the distributed database.

In the event that the set of statements of the transaction is to be executed at database servers located in a single availability zone, the set of statements is executed at the one or more database servers within the availability zone. In various embodiments, the first phase of a two-phase locking protocol (which is sometimes referred to as "2PL") is used to apply locks on the data affected by the executed set of statements. After a statement is executed, any changes to database data that is affected by the execution of the statement are tentative until the changes are made permanent by a commit operation. The finish time of the execution of at least the last statement of the transaction is recorded by the coordinator database server. The second phase of the two-phase locking protocol will release the locks after the transaction is determined to have been committed at the database. When only one availability zone was affected by the set of statements of a transaction, after the statement(s) are finished executing, a commit time for the entire transaction can be derived from the HLC within the sub-cluster that the coordinator database server resides. For example, if the coordinator database server were DB1 of system 200, then the commit timestamp of the transaction would be obtained from HLC 1 that is located in Sub-Cluster 1 of Availability Zone 1. If the set of statements had been executed at only a single database server within the single availability zone, then it is not necessary to perform a commit in two phases. The commit timestamp is sent by the coordinator database server to the affected database server and is recorded by the database server on which the statement(s) of the transaction had executed. The logs are written to and the locks are also released in accordance with the second phase of the two-phase locking protocol to complete the commit of the transaction. After the commit is complete for the transaction, any changes to the database's data that are caused by the execution of the statements are made permanent and also viewable to other transactions/observers. However, if the set of statements had been executed at multiple database servers within the single availability zone, then a two-phase commit protocol (which is sometimes referred to as "2PC") is used to perform the transaction commit. The two-phase commit protocol achieves atomicity of transactions. This guarantees a transaction is not completed partially. When the set of statements had been executed at more than one database server within the single availability zone, the coordinator database server performs the first phase of the two-phase commit protocol by sending a prepare command to each participating database server and then after receiving a prepare response from each participating database server, the coordinator database server performs the second phase of two-phase commit by sending a commit command and the commit timestamp to each participating database server. Performing a prepare command means a database will flush the transaction's modification log records to a persistent place, such as disk. This makes sure if the database crashes, the transaction's modification will not be lost. Performing a commit command means a database will complete the transaction after executing a prepare command, including setting the transaction's status as committed and releasing locks. The commit timestamp is then recorded by each participating database server, the logs are written to, and the locks are released in accordance to the second phase of two-phase locking. Commit timestamps may subsequently be used when data is read from the database. For example, a read operation includes a read timestamp and it's compared to the commit timestamps of requested data to determine which version of the requested data is to be read (e.g., the version of the requested data whose latest commit timestamp is determined to be earlier than the read timestamp). After the commit timestamp is recorded by the database server(s) and the locks released, the transaction is considered successful and a successful commit result (including the commit timestamp) is sent back to the originator of the transaction, application 204. Two-phase locking achieves serializability and external consistency for transactions that are only processed at database server(s) within one availability zone.

In the event that the set of statements of the transaction is to be executed at database servers located across more than one availability zone, the set of statements is executed at the one or more database servers across the plurality of availability zones. The finish time of the execution of at least the last statement of the transaction is recorded by the coordinator database server. In various embodiments, the first phase of the two-phase locking protocol is used to apply locks on the data affected by the executed set of statements. The first phase of the two-phase commit protocol is also applied by the coordinator database server sending a prepare command to each participating database server across the multiple availability zones. Each participating database server will complete the prepare command and send back to the coordinator database server a prepare timestamp that is obtained from the HLC that is local to the sub-cluster to which the participating database server belongs. The two-phase commit protocol coordination logic that is executed by the coordinator is to select the maximum/latest prepare timestamp that is received from a participating database server and to use the selected prepare timestamp as the commit timestamp for the transaction. For example, if the coordinator database server were DB1 of system 200, and the participating database servers for the transaction were DB2 and DB3, then DB2 would return to DB1 a prepare timestamp that is derived from HLC1 and DB3 would return to DB1 a prepare timestamp that is derived from HLC2. The coordinator database server would then send a commit command with the commit timestamp to each participating database server. In response, the participating database servers would record the commit timestamps with the affected data, write to the logs, release the locks, complete the commits, and send a commit return message to the coordinator database server. Once the commit return messages are received from all the participating database servers at the coordinator database server, the coordinator database server then determines whether to either immediately return a commit result for the transaction to application 204 or to first wait a time delay prior to returning a commit result for the transaction to application 204. As such, two-phase commit provides consistency across multiple availability zones for cross-availability zone transactions by using the maximum/latest prepare timestamp as the commit timestamp for the transaction. As such, selecting the maximum/latest prepare timestamp to use as the commit timestamp for the transaction in the two-phase commit protocol and causing each participating database server to record the commit timestamp for the transaction enables the multiple participating database servers that are located in different availability zones to honor the same commit timestamp for the transaction. Causing multiple participating database servers that are located in different availability zones to honor the same commit timestamp for the transaction achieves consistency. If the maximum timestamp across all participating database servers is not selected, there is possibility that a transaction coming after the transaction completing the two-phase commit protocol may acquire a larger commit timestamp but cannot read the completing transaction's data.

The external consistency of transactions across availability zones that have no causal relationship will be further explained here. HLC ensures that commit times of transactions that are each to be performed within the same availability zone and that have a causal relationship (e.g., one transaction causes another transaction to occur) are in sequence. However, for transactions that each occur in a different availability zone, if they have no causal relationship, their sequence in absolute time is not observable, as long as the clock skew between HLCs in the different availability zones is much smaller than the network latency between the availability zones. When the network latency between availability zones approaches or is even less than the maximum clock skew, the processing described above will be incorrect. The out-of-order commits of transactions caused by the clock skew can be seen by users from different availability zones, if the network latency between availability zones is smaller than the maximum clock skew. If the time (as obtained from a HLC from a different availability zone than the one in which the coordinator database server belongs to) at which the last statement of a transaction has finished execution is close to the time that is provided by the HLC that is local to the sub-cluster in which the coordinator database server resides, then, in various embodiments, a time delay is applied before the commit result of the transaction is returned to the application from which the transaction originated. In some embodiments, the approach for conditionally delaying the result of a transaction's commit result to the originator of the transaction is referred to as a "delayed start." As a result of this approach, the sequence of occurrence of transactions that have no causal relationship observed externally are consistent with the sequence of their commit timestamps. While the actual sequence of occurrence in absolute time of transactions without casual relationships is not observed by anyone, the use of the delayed start approach ensures that when observers use multiple sessions to execute multiple transactions, these transactions can see consistent results from the distributed database.

The role of the delayed start will be further explained as follows:

The causality of HLC ensures that transactions within the same database session are externally consistent due to the incrementing of the logical portion of the HLC in response to the processing of transactions. Within the same session, transactions are executed serially so the maintenance of the HLC ensures that greater commit timestamps will certainly be used for transactions that occur subsequently. The HLC further ensures that if the results of one transaction are read by another transaction, the commit timestamp of the latter transaction will be greater than the commit timestamp of the earlier transaction.

However, these relationships do not exist between transactions that occur among multiple/different database sessions. Under ordinary conditions, when two sessions are executed concurrently, the applications that originated the sessions are not concerned with (do not depend on) the sequence of occurrence of the transactions that are respectively executed for the two sessions. In more unusual circumstances, when an application launches and manages two database sessions, and uses the results returned by one session as the basis for decisions about the execution of the other session, the application in fact maintains an application-level session. In this situation, a relationship of dependence exists between the execution results of the transactions of the two sessions, and if the results of these transactions that are seen by the two sessions in absolute time and the commit timestamp sequence of these transactions are inconsistent, the application could generate erroneous judgments and results.

In various embodiments, it is only possible for transactions that virtually occur simultaneously (within the maximum clock skew) in different availability zones and have no causal relationship to result in the two sessions of the application seeing inconsistent results. An example of this scenario is described as follows:

Suppose there are three availability zones, AZ1, AZ2, and AZ3, and transaction Q1 occurs in AZ1, transaction Q2 occurs in AZ2, and an application APP3 launches two sessions, R1 and R2, in AZ3. The commit timestamps (that are recorded by the database) of Q1 and Q2 are t1 and t2, respectively, the absolute times of the commits of Q1 and Q2 are tabs1 and tabs2, respectively, and suppose they satisfy the relationships below:

$$t1>t2 \quad (1)$$

$$tabs1<tabs2 \quad (2)$$

In other words, the commit sequence of Q1 and Q2 in absolute time and the relative values of their commit timestamps that are recorded/honored by the database are inconsistent. This inconsistency is caused by the clock skew between the corresponding time service systems implemented respectively at AZ1 and AZ2 where Q1 and Q2 had respectively been executed. Based on the commit time relationships described above, the following relationship is known:

$$tabs1+maximum\ clock\ skew>tabs2 \quad (3)$$

Suppose that transactions R1 and R2 respectively access AZ1 and AZ2 and their respective access times are tabs11 and tabs22 and that the times satisfy the following relationship:

$$tabs2>tabs22>tabs11>tabs1 \quad (4)$$

Put another way, R1 had accessed AZ1 after the results of Q1 had committed at the database while R2 had accessed AZ2 prior to the results of Q2 committing at the database. As a consequence, R1 is able to see the results of Q1, but R2 is not able to see the results of Q2. If this application depends on the commit results of R1 to determine the operation of R2, the application sees inconsistent results. This is because, based on the commit timestamps in the database, Q2 results should be visible when the Q1 results are visible. In other words, given that R1 and R2 have a causal relationship and that R2 is to be performed after R1 has completed, the operation results of R2 would be different depending on whether R2 had been issued prior to the results of Q2 having been committed at the database in absolute time. Had the results of Q2 been committed prior to the execution of R2, then the operation of R2 could yield one operation result yet if the results of Q2 had not been committed prior to the issuance of R2 (such as described in the scenario above), then the operation of R2 could yield another operation result. This inconsistency in the operation result of R2 would be problematic because, depending when R2 is executed, R2 could yield a different operation result relative to the execution of Q2 despite their database issued commit timestamps indicating a consistent order.

After the time delay as described is added to returning the commit result of the transaction in session R1 in this example, with a time delay that is equivalent to the maximum clock skew (e.g., 10 ms), the following relationships would result:

$$tabs22>tabs11+maximum\ clock\ skew>tabs1+maximum\ clock\ skew \quad (5)$$

Given that relationship (3) indicated that tabs1+maximum clock skew>tabs2, relationship (5) could be rewritten as the following:

$$tabs22>tabs11+maximum\ clock\ skew>tabs1+maximum\ clock\ skew>tabs2 \quad (6)$$

Thus, by adding the time delay (that is at least equal to the maximum clock skew) to transaction(s) occurring within session R1, it is ensured that tabs22>tabs2. Put another way, the use of the delayed start technique delays the return of the commit result (e.g., transaction complete) of a transaction in session R1 such that a transaction in session R2 would be guaranteed to see the results of transaction Q2.

In general, the use of the delayed start technique can ensure that the magnitudes of single available zone and cross-availability zone transactions commit timestamps and the observed sequence of their results are consistent. In other words, although the commit timestamps may not reflect the commit sequence in terms of absolute time, they reflect the consistent sequence that is always observed, so that the commit sequence in absolute time is no longer critical.

Although the application of delayed start concept was briefly described above, how a delayed start may be conditionally used to return a commit result of a transaction to the application is described in further detail, in accordance with some embodiments, as follows:

One transaction may include multiple (e.g., SQL) statements. The statements in a transaction may be executed at database servers that are spread across one or more availability zones. Each time that the execution of a statement of the transaction is finished, the timestamp at which the statement execution finished is obtained from the HLC that is local to the sub-cluster in the availability zone in which the database server that had executed the statement is located. In a single-availability zone case, the execution finish timestamp of the last statement that is executed in the availability zone is recorded. In a cross-availability zone case, the execution finish timestamp at which the last statement that is executed in an availability zone that is other than the availability zone in which the coordinator database server is located is recorded. For example, referring to FIG. 2, if DB1, which is located in AZ1/SC1 were the coordinator database server that is processing a cross-availability zone transaction that comprises statements S1 and S2, if S1 is executed at DB2 of AZ1/SC1 and S2 is executed at AZ2/SC2, then the finish timestamp of the execution of S2 at DB2 of AZ1/SC1 is recorded because S2 is the last statement executed in a non-local availability zone (AZ2) relative to the availability zone of the coordinator (AZ1). Upon a successful commit of the results of S1 and S2 of the transaction, it is determined whether to return the commit result of the transaction to application 204 immediately or to wait a time delay. It is determined whether the time difference between the recorded finish execution time of the last statement and the current time as indicated by the HLC that is local to the sub-cluster and availability zone in which the coordinator database server resides is equal to or less than a predetermined time skew (e.g., the predetermined time skew could be the maximum clock skew). If the difference is less or equal to the predetermined time skew, then a time delay (e.g., that equals to the maximum clock skew) is waited before the commit result of the transaction is returned to the application. Otherwise, if the difference is greater than the predetermined time skew, then the commit result of the transaction is returned to the application without a time delay. In this way, a subsequent, dependent transaction cannot be executed until after the commit result of a prior transaction is received (due to application design), because the return of the commit result of the prior transaction is delayed, if needed. As a result, the subsequent transaction will be prevented from accessing results that are inconsistent (according to the recorded commit timestamps in the database) with those seen by the prior transaction (such as transactions Q1 and Q2 described above). If any other transaction reads the results of this transaction after this transaction is committed, but before its result is returned to the application, the commit timestamp of those read transactions will certainly be greater than that of this transaction.

The following example applies the features of the delayed start to FIG. 2: Assume that DB1, which is located in AZ1/SC1, is the coordinator database server and is processing a cross-availability zone transaction (received from application 204) that comprises statements S1 and S2. If S1 is executed at DB2 of AZ1/SC1 and S2 is executed at DB3 of AZ2/SC2, then the finish timestamp of the execution of S2 at DB3 AZ2/SC2 is recorded. Given that S2 was executed in SC2 of AZ2, the finish timestamp of the execution of S2 is obtained from HLC2 of AZ2/SC2. After it is determined that both DB1 and DB2 had finished committing, then it is determined whether the commit results of the transaction should be sent to application 204 immediately or after waiting a time delay. Coordinator, DB1, then determines a difference between a current time that is acquired from HLC1 (because HLC1 is local to the sub-cluster of the availability zone in which DB1 is located) and the finish timestamp of the execution of S2. If this difference does not exceed a predetermined time skew (e.g., which is set to be equal to the maximum clock skew between at least HLC1 and HLC2), then DB1 waits a time delay (e.g., which is also set to be equal to the maximum clock skew between at least HLC1 and HLC2) before returning the commit result of the transaction back to application 204.

In various embodiments, for transactions that are executed within only one availability zone, the logic clock portion of a HLC only goes up when the transactions are committed, in order to distinguish the submission sequence of different transactions. For transactions that are executed across multiple availability zones, not only does the logical clock portion of the HLC increase when transactions are committed, but, in some embodiments, the HLC also needs to be updated when read operations from other availability zones are received at a database server that is local to the HLC. If the HLC timestamp that is received from an operation (e.g., associated with a statement) from the other availability zone is greater than the HLC that is local to the availability zone in which the operation result is received, the local HLC is correspondingly increased. For example, an operation from another availability zone may include a read operation or a commit command. Put another way, when an operation from a non-local availability zone is received at the coordinator database server, the operation carries the HLC-based timestamp of that non-local availability zone and if that HLC-based timestamp is greater than the local HLC, the local HLC needs to be updated. For example, updating a HLC may refer to incrementing the logical clock portion of the HLC to match the received timestamp that is derived from another HLC that corresponds to a different availability zone. In another example, updating a HLC may refer to incrementing the logical clock portion of the HLC by a predetermined amount (e.g., 1). In various embodiments, a maximum HLC is maintained for each session in order to ensure consistency of transactions within a session. For example, if the session-level HLC is received at a coordinator database server and if the session-level HLC is greater than the HLC that is local to the coordinator database server, then the HLC that is local to the coordinator database server is updated accordingly.

As shown above, various embodiments enable a database to be scaled across multiple availability zones to ensure high availability and access to proximate data while also decreasing latency for the (e.g., majority of) transactions that are only executed within single availability zones, so that, while global strong consistency is ensured, the database is not affected by high latency across availability zones.

FIG. 3 is a diagram showing an embodiment of a HLC. Each of HLC1 and HLC2 of FIG. 2 may be implemented using the example of FIG. 3. HLC 300 includes two portions, physical clock 302 and logical clock 304. As mentioned above, physical clock 302 increments as time elapses and logical clock 304 increments as events occur during the smallest unit of time (e.g., microsecond) in physical clock 302. In some embodiments, HLC 300 is implemented using 64 bits, where 48 bits are allocated to physical clock 302 and the other 16 bits are allocated to logical clock 304. In some embodiments, physical clock 302 represents a physical clock up to the microsecond granularity. In some embodiments, logical clock 304 can be thought of as a counter that is incremented upon the occurrence of events at the database and is reset to zero each time that physical clock 302 is incremented (e.g., by the smallest unit of time that it captures, which could be, for example, a microsecond). Clock synchronization protocols, in some embodiments, synchronize physical clock 302 of HLC 300 with that of one or more other HLCs. Logical clock 304 helps capture chronological and causal relationships in a distributed database by issuing an order of events.

Figure 4:
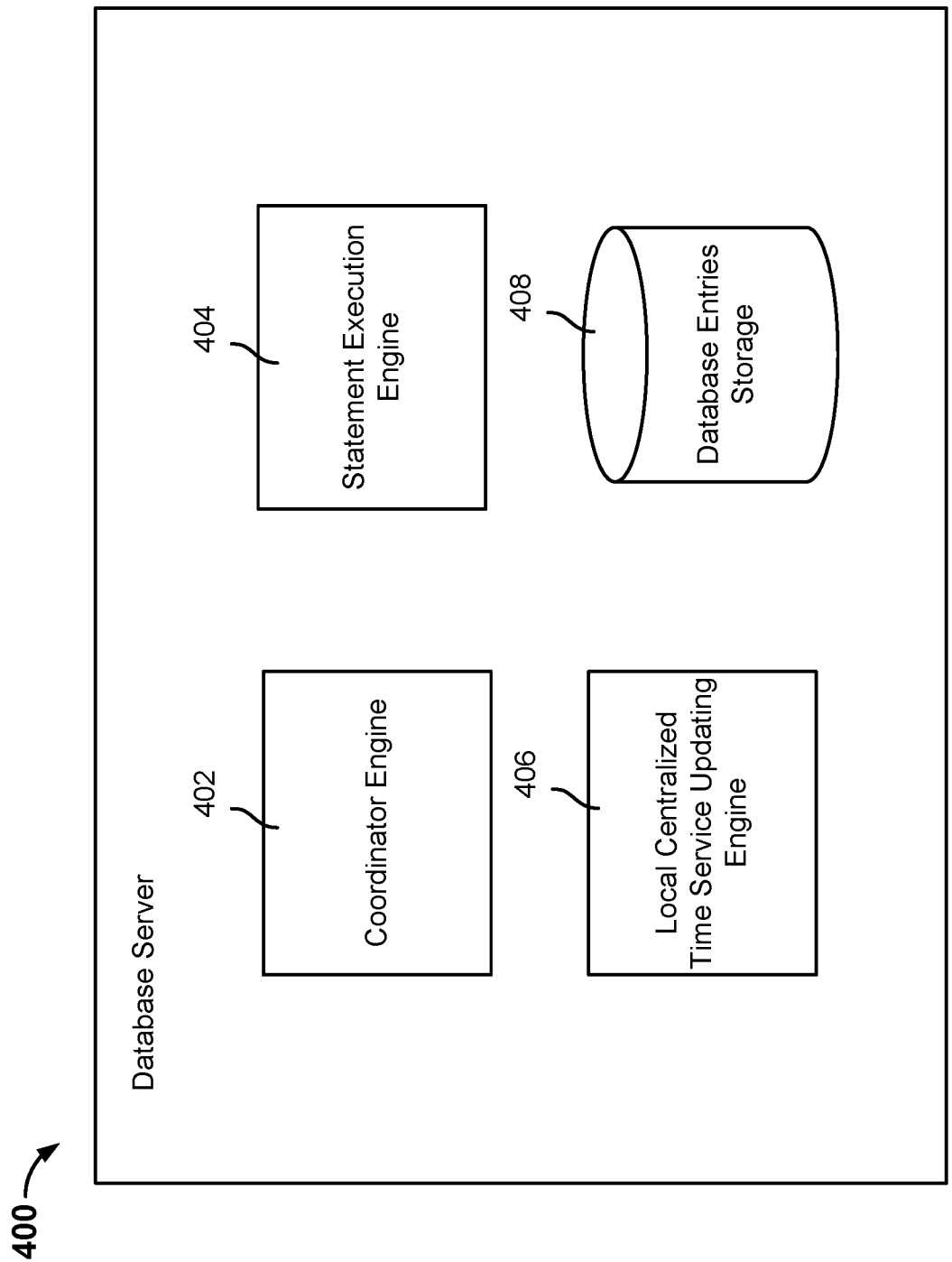
FIG. 4 is a diagram showing an example of a database server.

FIG. 4 is a diagram showing an example of a database server. In some embodiments, database servers DB1, DB2, DB3, and DB4 are each implemented using the example of FIG. 4. Database server 400 includes coordinator engine 402, statement execution engine 404, local centralized time service updating engine 406, and database entries storage 408. Each of coordinator engine 402, statement execution engine 404, and local centralized time service updating engine 406 may be implemented using one or more of hardware and/or software. Database entries storage 408 may be implemented using one or more types of storage media.

Coordinator engine 402 is configured to perform functions associated with processing a transaction that is received from an application when database server 400 is selected (e.g., by a two-phase commit protocol) to serve as a coordinator for a particular transaction. The transaction is a set of one or more statements (e.g., SQL commands). Coordinator engine 402 is configured to determine whether the transaction (all the statement(s) thereof) is to be executed within one availability zone or across more than one availability zone. For example, whether the transaction is to be executed within one availability zone or across more than one availability zone may be determined based on hint information that is provided by the application.

In the event that the transaction is to be executed within a single availability zone, coordinator engine 402 is configured to execute all the statement(s) of the transaction across one or more participating database servers of that availability zone and a transaction commit timestamp from the centralized time service (HLC) corresponding to that availability zone. If the statements were executed at more than one database server, then coordinator engine 402 uses the two-phase commit protocol to verify that all participating database servers are ready to commit their executed portions of their respective databases. Coordinator engine 402 is also configured to record the timestamp at which the execution of each statement finished from each participating database. Because all the participating database server(s) on which the statement(s) were executed were located within the same availability zone and therefore shared the same HLC, there is no concern of clock skew or network latency with respect to sending information across availability zones. As such, in some embodiments, after the participating database servers record the commit timestamp with portions of a database that were affected by the statement(s) of the transaction, coordinator engine 402 may immediately return a commit result associated with the transaction to the application without waiting a time delay before doing so. In some other embodiments, coordinator engine 402 determines a difference between the a) finish timestamp of the last statement of the transaction and b) the current time as indicated by the HLC that is local to the sub-cluster of the availability zone to which database server 400 belongs. Coordinator engine 402 compares this difference to a predetermined time skew. If the difference is greater than the predetermined time skew, coordinator engine 402 is configured to immediately return the commit result to the application. However, if the difference is less than or equal to the predetermined time skew, coordinator engine 402 is configured to first wait a predetermined time delay before returning the commit result to the application In the event that the transaction is to be executed across multiple availability zones, coordinator engine 402 is configured to execute all the statement(s) of the transaction across the participating database servers across the availability zones. Coordinator engine 402 is also configured to record the timestamp at which the execution of each statement finished from each participating database. Each such finish timestamp is determined based on the HLC that is local to the sub-cluster of the availability zone in which the participating database server is located. Coordinator engine 402 is configured to identify the finish timestamp of the execution of the last statement of the transaction that was executed at a database server that is in an availability zone other than the availability zone in which database server 400 is located. Due to there being more than one participating database server being involved in executing the statements of the transaction, coordinator engine 402 is configured to use the two-phase protocol to send a prepare command to each participating database server across the multiple availability zones. Coordinator engine 402 is then configured to receive a prepare timestamp from each participating database server with a response of whether they are ready to commit. Each prepare timestamp that is received from a database server is acquired from the HLC that is local to the sub-cluster of the availability zone in which the database server is located. If coordinator engine 402 receives successful prepare responses from all participating database servers, coordinator engine 402 is configured to select the maximum prepare timestamp associated with any of the prepare responses to use as the commit timestamp for the transaction. Coordinator engine 402 then sends the transaction commit timestamp to each participating database server, which records the commit timestamp with its locally affected data. Once coordinator engine 402 receives a commit confirmation from each participating database server, coordinator engine 402 is configured to determine whether a time delay should be waited prior to returning a commit result to the application. In various embodiments, coordinator engine 402 determines a difference between the a) finish timestamp of the execution of the last statement of the transaction that was executed at a database server that is in an availability zone other than the availability zone in which database server 400 is located and b) the current time as indicated by the HLC that is local to the sub-cluster of the availability zone to which database server 400 belongs. Coordinator engine 402 compares this difference to a predetermined time skew. If the difference is greater than the predetermined time skew, coordinator engine 402 is configured to immediately return the commit result to the application. However, if the difference is less than or equal to the predetermined time skew, coordinator engine 402 is configured to first wait a predetermined time delay before returning the commit result to the application.

Statement execution engine 404 is configured to execute statements that affect data stored at database entries storage 408. Statement execution engine 404 is configured to receive statements comprising commands for managing database data. Statement execution engine 404 is configured to receive statements from database servers that are selected to serve as coordinators for processing transactions. Statement execution engine 404 is configured to execute each received statement at the relevant portions (e.g., data entries) of database entries storage 408. In some embodiments, statement execution engine 404 records timestamps corresponding to when the execution of a statement started and/or finished based on the HLC that is local to the sub-cluster of the availability zone to which database server 400 belongs. After the successful execution of a statement, statement execution engine 404 sends the recorded execution start and finish timestamps to the coordinator database server, which may or may not be located in the same availability zone as database server 400.

For transactions whose statements are executed on more than just database server 400, statement execution engine 404 is configured to receive a prepare command from the coordinator database server as the first phase of the two-phase commit protocol. In response to the prepare command, statement execution engine 404 is configured to perform one or more actions associated with the prepare command. In response to the prepare command, statement execution engine 404 is also configured to send back to the coordinator database server a prepare response with a prepare timestamp that is obtained from the HLC that is local to the sub-cluster of the availability zone to which database server 400 belongs. During the second phase of the two-phase commit for a transaction whose statements are executed on more than just database server 400, statement execution engine 404 is configured to receive a commit command from the coordinator database server, where the commit command includes a commit timestamp for the transaction. In response to the prepare command, statement execution engine 404 is configured to perform one or more actions associated with the commit command and record the transaction commit timestamp. In response to the commit command, statement execution engine 404 is also configured to send back to the coordinator database server a commit response.

Local centralized time service updating engine 406 is configured to update the HLC that is local to the sub-cluster of the availability zone to which database server 400 belongs in response to certain events. In various embodiments, local centralized time service updating engine 406 is configured to determine whether to update the HLC that is local to the sub-cluster of the availability zone to which database server 400 belongs at certain events. In some embodiments, when database server 400 receives execution results of a statement that comprises a read operation that was executed at another availability zone and includes a read timestamp that is obtained from a HLC in the other availability zone, local centralized time service updating engine 406 is configured to compare the read timestamp from the non-local availability zone to the current local HLC (the HLC that is local to the sub-cluster of the availability zone to which database server 400 belongs) and if the read timestamp from the non-local availability zone is greater than the current local HLC, then local centralized time service updating engine 406 is configured to update the local HLC (e.g., to match the read timestamp that was obtained from the HLC of the non-local availability zone). In some embodiments, when database server 400 receives a commit command with a commit timestamp from a coordinator database server that is located in a non-local availability zone, local centralized time service updating engine 406 is configured to compare the commit timestamp from the non-local availability zone to the current local HLC and if the commit timestamp from the non-local availability zone is greater than the current local HLC, then local centralized time service updating engine 406 is configured to update the local HLC (e.g., to match the commit timestamp that was obtained from the HLC of the non-local availability zone). In some embodiments, when database server 400 is selected to be a coordinator database and receives a transaction to process for a particular session, the transaction is received with a session-level HLC timestamp. In some embodiments, the session-level HLC timestamp is equivalent to the commit timestamp or rollback timestamp of the transaction that was the most recently executed in that session. Local centralized time service updating engine 406 is configured to compare the session-level HLC timestamp from the non-local availability zone to the current local HLC and if the session-level HLC timestamp from the non-local availability zone is greater than the current local HLC, then local centralized time service updating engine 406 is configured to update the local HLC (e.g., to match the session-level HLC timestamp).

FIG. 5 is a flow diagram showing an embodiment of a process for processing a transaction at a database that is distributed across availability zones. In some embodiments, process 500 may be implemented at any one of database servers DB1, DB2, DB3, and DB4 of system 200 of FIG. 2 that has been selected to serve as a coordinator database server for a transaction.

At 502, it is determined that a transaction comprising a set of one or more statements is to be executed on a plurality of database servers across at least two availability zones. For example, hint information from the application from which the transaction was originated is used to determine whether the transaction is a cross-availability zone transaction. Each availability zone includes at least a sub-cluster of database servers and each sub-cluster of database servers includes its own centralized time service clock that uses the HLC protocol.

At 504, the set of one or more statements is caused to execute on the plurality of database servers across the at least two availability zones. At least one statement is executed at a database server that is located in a first availability zone and at least one statement is executed at a database server that is located in a second availability zone.

In various embodiments, a HLC-based finish timestamp associated with an execution of a last statement of the set of one or more statements is obtained. The time at which each statement finishes execution is determined based on the HLC that is located in the sub-cluster of the availability zone in which the database server that had executed the statement belongs. In some embodiments, the "last statement" refers to the last statement of the transaction that is executed in a non-local availability zone relative to the availability zone in which the coordinator database server is located.

At 506, a plurality of HLC-based prepare timestamps is obtained from the plurality of database servers across the at least two availability zones.

At 508, a maximum HLC-based prepare timestamp is selected to use as a commit timestamp associated with the transaction. A version of the two-phase commit protocol is used to commit the transaction. Because the statements are executed by at least two database servers that are located, respectively, in at least two different availability zones, the prepare timestamps that are sent back by the participating database servers will each be derived from the respective local HLC that is located in the sub-cluster of the availability zone in which they belong. The largest prepare timestamp that is sent back in response to the prepare command is selected to serve as the commit timestamp for the transaction. The database servers are caused to commit the transaction using the commit timestamp that they receive from the coordinator.

At 510, it is determined whether to return a commit result after a time delay that is determined based at least in part on a predetermined time skew. In various embodiments, the difference between the finish timestamp of the execution of the last statement that was executed in a non-local availability zone and the current time as indicated by the HLC that is local to the sub-cluster in the availability zone that the coordinator database server belongs is determined. In some embodiments, the predetermined time skew is determined to be equal to the maximum clock skew (e.g., 10 ms). In some embodiments, the time delay is also set to be equal to the predetermined time skew. In various embodiments, the difference is compared to the predetermined time skew and if the difference is less than or equal to the predetermined time skew, the commit result is returned (e.g., to the source of the transaction) after the time delay.

Figure 6:
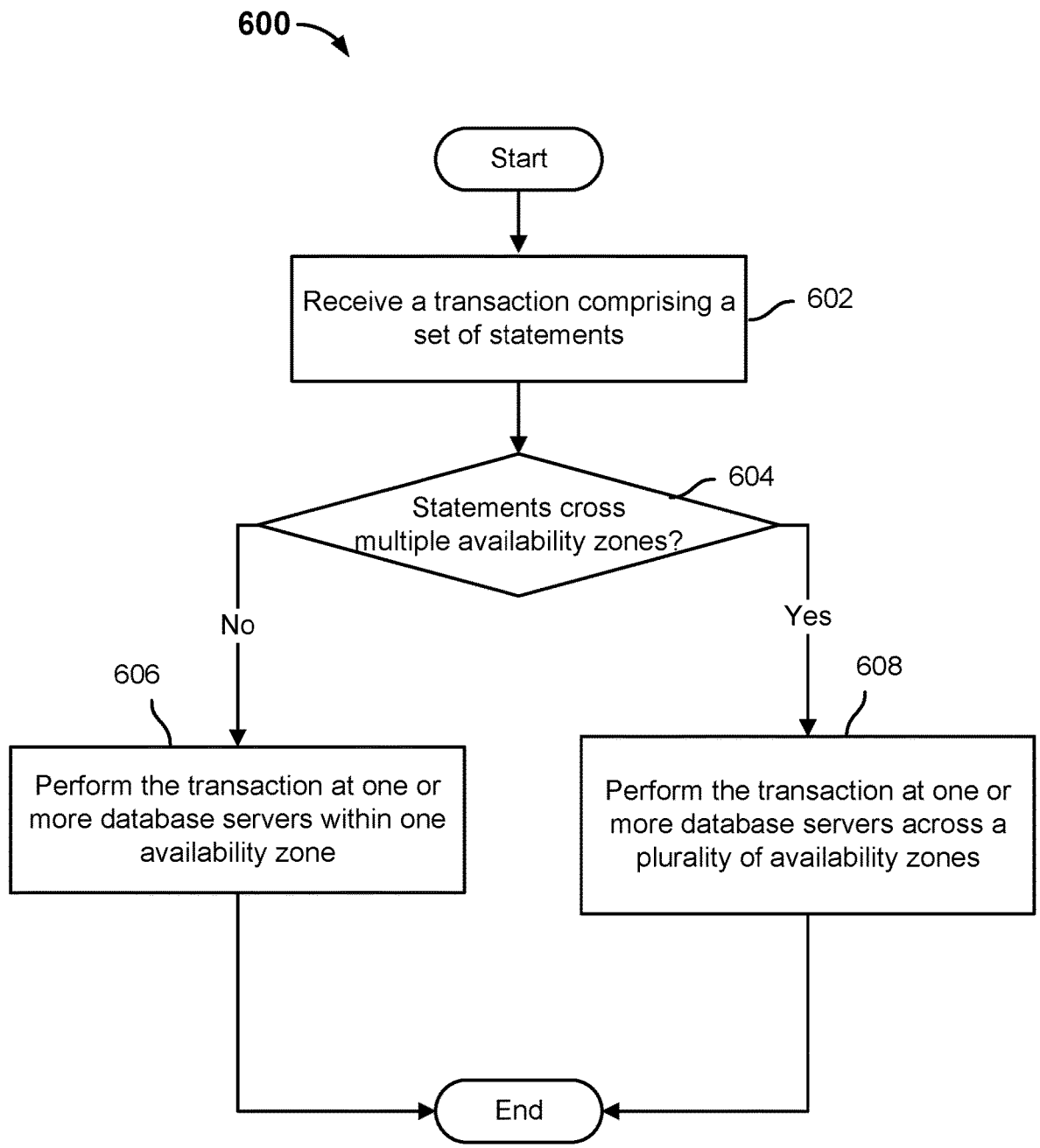
FIG. 6 is a flow diagram showing an example of a process for determining whether a transaction is to be executed across a plurality of availability zones.

FIG. 6 is a flow diagram showing an example of a process for determining whether a transaction is to be executed across a plurality of availability zones. In some embodiments, process 600 may be implemented at any one of database servers DB1, DB2, DB3, and DB4 of system 200 of FIG. 2 that has been selected to serve as a coordinator database server for the transaction.

At 602, a transaction comprising a set of statements is received. For example, the transaction is received from an application as part of a particular session.

At 604, it is determined whether the set of statements is to be executed across multiple availability zones. In the event that the set of statements is to be executed within a single availability zone, control is transferred to 606. Otherwise, in the event that the set of statements is to be executed across multiple availability zones, control is transferred to 608. In some embodiments, whether the set of statements is to be executed within a single availability zone or across multiple availability zones is determined based on the hint information that is provided by the application. Whether the transaction is a cross-availability zone transaction may also be determined based on any other appropriate technique.

At 606, the transaction is performed at one or more database servers within one availability zone.

At 608, the transaction is performed at one or more database servers across a plurality of availability zones.

Figure 7:
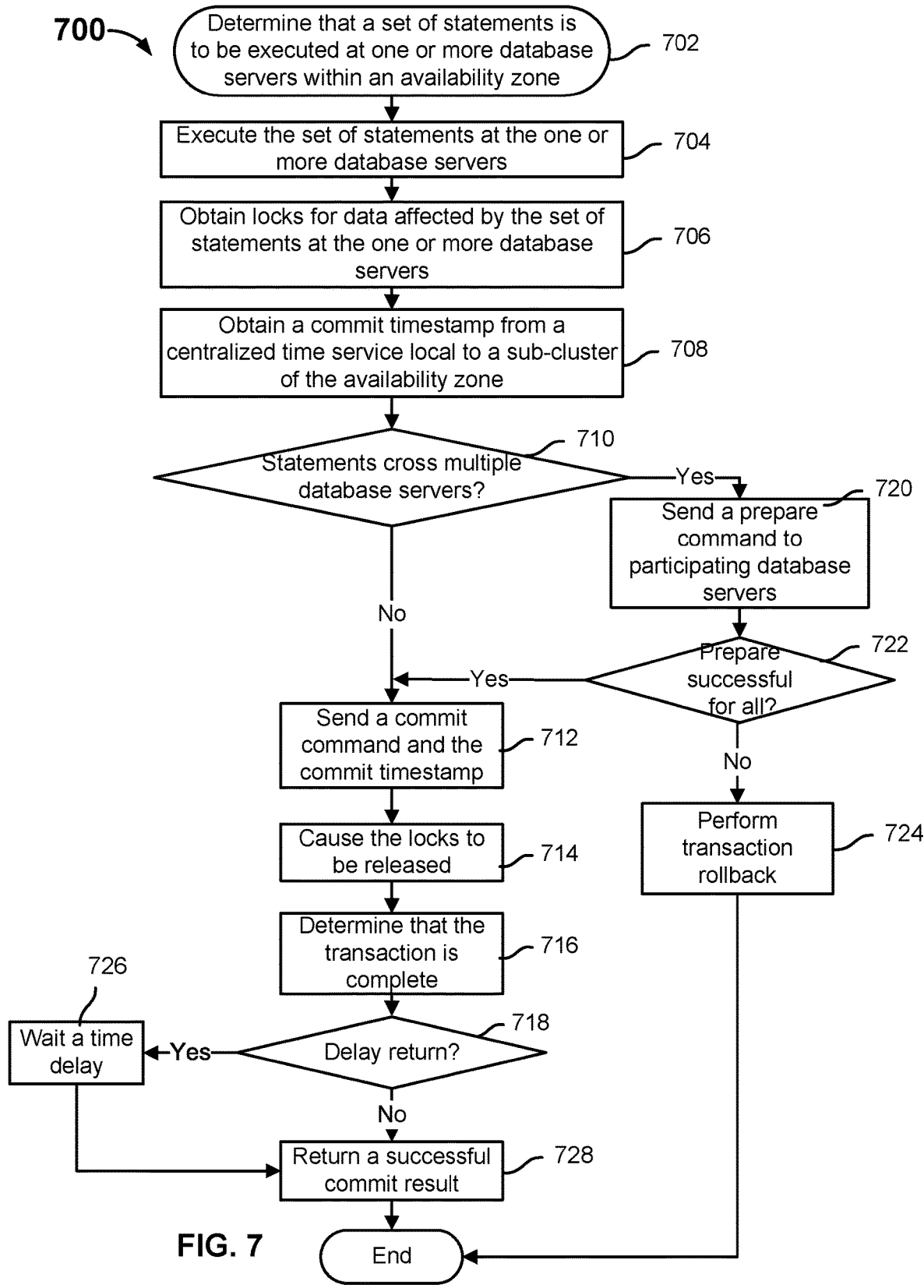
FIG. 7 is a flow diagram showing an example of a process for performing a transaction at one or more databases within a single availability zone.

FIG. 7 is a flow diagram showing an example of a process for performing a transaction at one or more databases within a single availability zone. In some embodiments, process 700 may be implemented at any one of database servers DB1, DB2, DB3, and DB4 of system 200 of FIG. 2 that has been selected to serve as a coordinator database server for the transaction. In some embodiments, step 606 of process 600 of FIG. 6 may be implemented, at least in part, using process 700.

At 702, it is determined that a transaction comprising set of statements is to be executed at one or more database servers within an availability zone.

At 704, the set of statements is executed at the one or more database servers. After the statement(s) are executed on their respective participating database servers, any changes to the database data are tentative and not viewable by other transactions until the transaction in question is committed.

At 706, locks for data affected by the set of statements are obtained at the one or more database servers. Using the two-phase locking protocol, the data that is tentatively changed by the statement(s) is locked (so that the data is not changed again by another, concurrent transaction before the transaction in question is committed).

At 708, a commit timestamp is obtained from a centralized time service local to a sub-cluster of the availability zone. Because the statement(s) of the transaction are executed at database server(s) located within the sub-cluster of the same availability zone and all such database server(s) share a centralized time service (a local HLC), the commit timestamp at the database for the transaction is obtained from the local HLC after the execution of each of the statement(s).

At 710, it is determined whether the set of statements was executed at multiple database servers. If the statement(s) were executed at only one database server, then the commit operation could be performed without using the two-phase commit protocol and control is directly transferred to 712. Otherwise, if the statement(s) were executed at more than one database server, than the commit operation is to be performed using the two-phase commit protocol and control is first transferred to 720.

At 712, a commit command and the commit timestamp are sent to the database server(s). A commit command and the commit timestamp are sent to each one of the participating database servers at which a statement was executed.

At 714, the locks are caused to be released. Once the commit operation is performed at each participating database server, the tentative changes made by executed statements are made permanent and the locks on affected data can be released in the second phase of the two-phase locking protocol.

At 716, it is determined that the transaction is complete. Once the commit operation is complete at each participating database server and the locks are released, the transaction is considered complete.

At 718, it is determined whether to delay the return of a successful commit result message. In the event that it is determined to delay the return of the successful commit result message, control is transferred to 726. Otherwise, in the event that it is determined to not delay the return of the successful commit result message, control is transferred to 728.

In various embodiments, whether the return of the successful commit result of the transaction is to be delayed is determined by first determining a difference between the finish timestamp of the execution of the last statement that was executed and the current time that is indicated by the HLC that is local to the sub-cluster of the availability zone in which the coordinator database server resides. This difference is compared to a predetermined time skew. For example, the predetermined time skew is to be the maximum clock skew (e.g., 10 ms) between HLCs of different availability zones.

If the difference were greater than the predetermined time skew, then the commit result is returned immediately. Otherwise, if the difference is equal to or less than the predetermined time skew, a time delay elapses before the commit result is returned to the application.

At 728, the successful commit result is returned. The successful commit result is returned to the application from which the transaction originated.

At 726, a time delay is waited. For example, the time delay is set to be a maximum clock skew between HLCs of different availability zones. After the time delay of the maximum clock skew elapses, the successful commit result is returned to the application from which the transaction originated.

At 720, a prepare command is sent to the participating database servers. A prepare command is sent to each participating database server as the first phase of the two-phase commit protocol.

At 722, it is determined whether the prepare command was successfully performed by all of the participating database servers. In the event that it was determined that all of the participating database servers had sent back successful prepare responses, control is transferred to 712. Otherwise, in the event that fewer than all of the participating database servers had sent back successful prepare responses, control is transferred to 724. Unless all participating database servers send back successful prepare responses, the two-phase commit protocol does not permit the transaction to proceed to commit.

At 724, transaction rollback is performed. If at least one participating database server did not return a successful prepare response, then a transaction rollback is performed, in which all the tentative changes made by the execution of the statement(s) of the transaction are ignored or discarded and the database's data is returned to its state prior to the execution of the statement(s).

Figure 8:
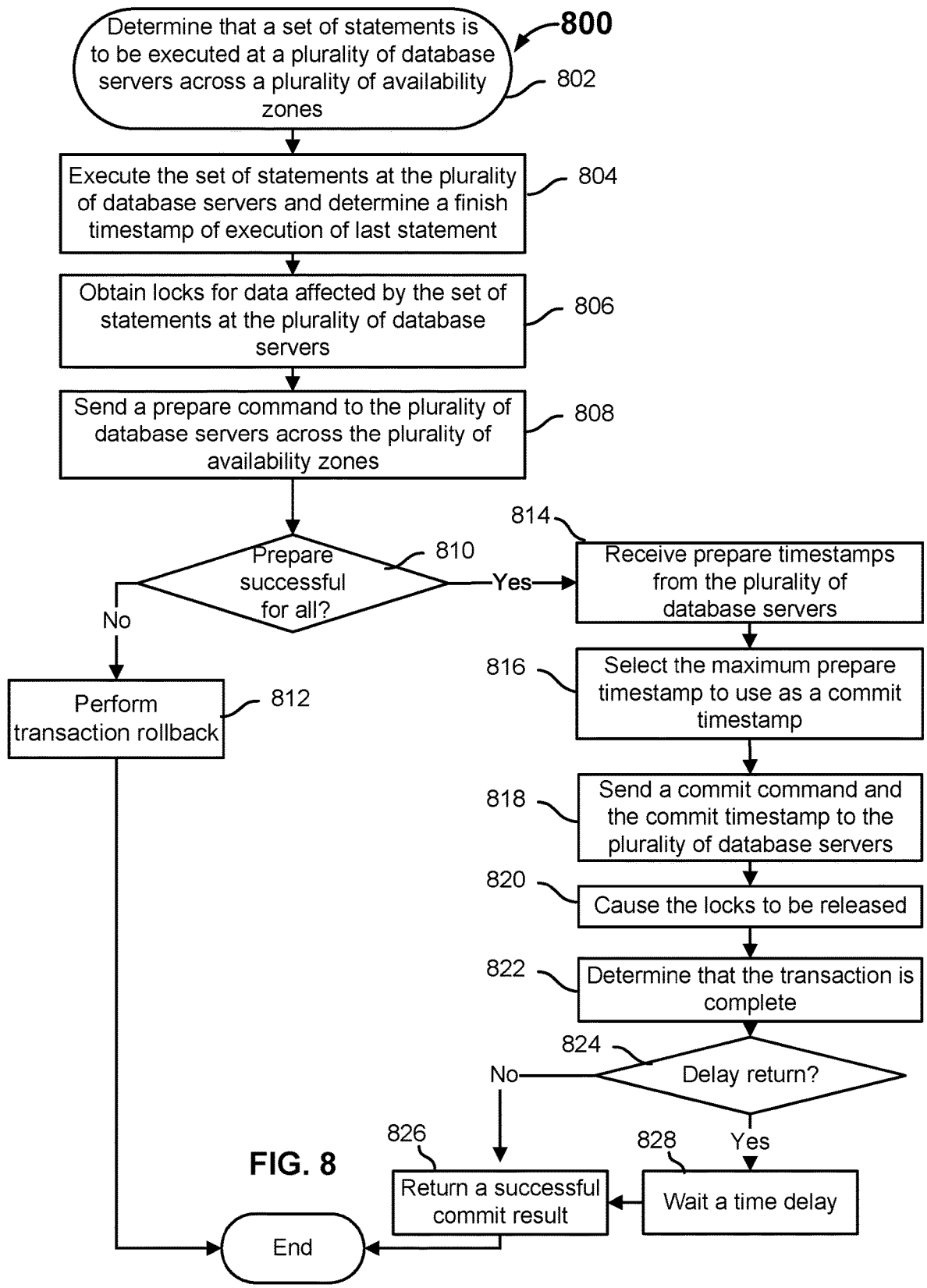
FIG. 8 is a flow diagram showing an example of a process for performing a transaction at one or more databases across a plurality of availability zones.

FIG. 8 is a flow diagram showing an example of a process for performing a transaction at one or more databases across a plurality of availability zones. In some embodiments, process 800 may be implemented at any one of database servers DB1, DB2, DB3, and DB4 of system 200 of FIG. 2 that has been selected to serve as a coordinator database server for the transaction. In some embodiments, step 608 of process 600 of FIG. 6 may be implemented, at least in part, using process 800.

At 802, it is determined that a set of statements is to be executed at a plurality of database servers across a plurality of availability zones.

At 804, the set of statements is executed at the plurality of database servers and a finish timestamp of an execution of a last statement is determined. After the statements are executed on their respective participating database servers, any changes to the database data are tentative and not viewable by other transactions until the transaction in question is committed. In some embodiments, the finish timestamp of the execution of each statement at a database server is recorded. In various embodiments, the finish timestamp of the execution of the last statement that is executed at a database server that is located in the sub-cluster of an availability zone that is not the same availability zone that the coordinator database server resides in is determined. Put another way, the finish timestamp of the execution of the last statement that was executed in a non-local (relative to the availability zone in which the coordinator database server resides) availability zone is determined.

At 806, locks for data affected by the set of statements are obtained at the plurality of database servers. Using the two-phase locking protocol, the data that is tentatively changed by the statement(s) is locked (so that the data is not changed again by another, concurrent transaction before the transaction in question is committed).

At 808, a prepare command is sent to the plurality of database servers across the plurality of availability zones. A prepare command is sent to each participating database server as the first phase of the two-phase commit protocol.

At 810, it is determined whether the prepare command was successfully performed by all of the plurality of database servers. In the event that it was determined that all of the participating database servers had sent back successful prepare responses, control is transferred to 814. Otherwise, in the event that fewer than all of the participating database servers had sent back successful prepare responses, control is transferred to 812. Unless all participating database servers sent back successful prepare responses, the two-phase commit protocol does not permit the transaction to proceed to commit.

At 812, transaction rollback is performed. If at least one participating database server did not return a successful prepare response, then a transaction rollback is performed, in which all the tentative changes made by the execution of the statement(s) of the transaction are ignored or discarded and the database's data is returned to its state prior to the execution of the statement(s).

At 814, prepare timestamps from the plurality of database servers are received. The prepare timestamp that is sent by each participating database server with the successful prepare response is derived from the HLC that is local to the sub-cluster of the availability zone in which the database server is located.

At 816, the maximum prepare timestamp is selected to use as a commit timestamp. The maximum prepare timestamp of the ones that are returned by the participating database servers is selected to use as the commit timestamp at the database for the transaction.

At 818, a commit command and the commit timestamp are sent to the plurality of database servers. A commit command and the commit timestamp for the transaction are sent to each one of the participating database servers at which a statement was executed.

At 820, the locks are caused to be released. Once the commit operation is performed at each participating database server, the tentative changes made by executed statements are made permanent and the locks on affected data can be released in the second phase of the two-phase locking protocol.

At 822, it is determined that the transaction is complete. Once the commit operation is complete at each participating database server and the locks are released, the transaction is considered complete.

At 824, it is determined whether to delay the return of a successful commit result message. In the event that it is determined to delay the return of the successful commit result message, control is transferred to 828. Otherwise, in the event that it is determined to not delay the return of the successful commit result message, control is transferred to 826.

In various embodiments, whether the return of the successful commit result of the transaction is to be delayed is determined by first determining a difference between the finish timestamp of the execution of the last statement that was executed in a non-local availability zone (as determined at 804) and the current time that is indicated by the HLC that is local to the sub-cluster of the availability zone in which the coordinator database server resides. This difference is compared to a predetermined time skew. For example, the predetermined time skew is to be the maximum clock skew (e.g., 10 ms) between HLCs of different availability zones.

If the difference were greater than the predetermined time skew, then the commit result is returned immediately. Otherwise, if the difference is equal to or less than the predetermined time skew, a time delay elapses before the commit result is returned to the application.

At 826, the successful commit result is returned. The successful commit result is returned to the application from which the transaction originated.

At 828, a time delay is waited. For example, the time delay is set to be a maximum clock skew between HLCs of different availability zones. After the time delay of the maximum clock skew elapses, the successful commit result is returned to the application from which the transaction originated.

Figure 9:
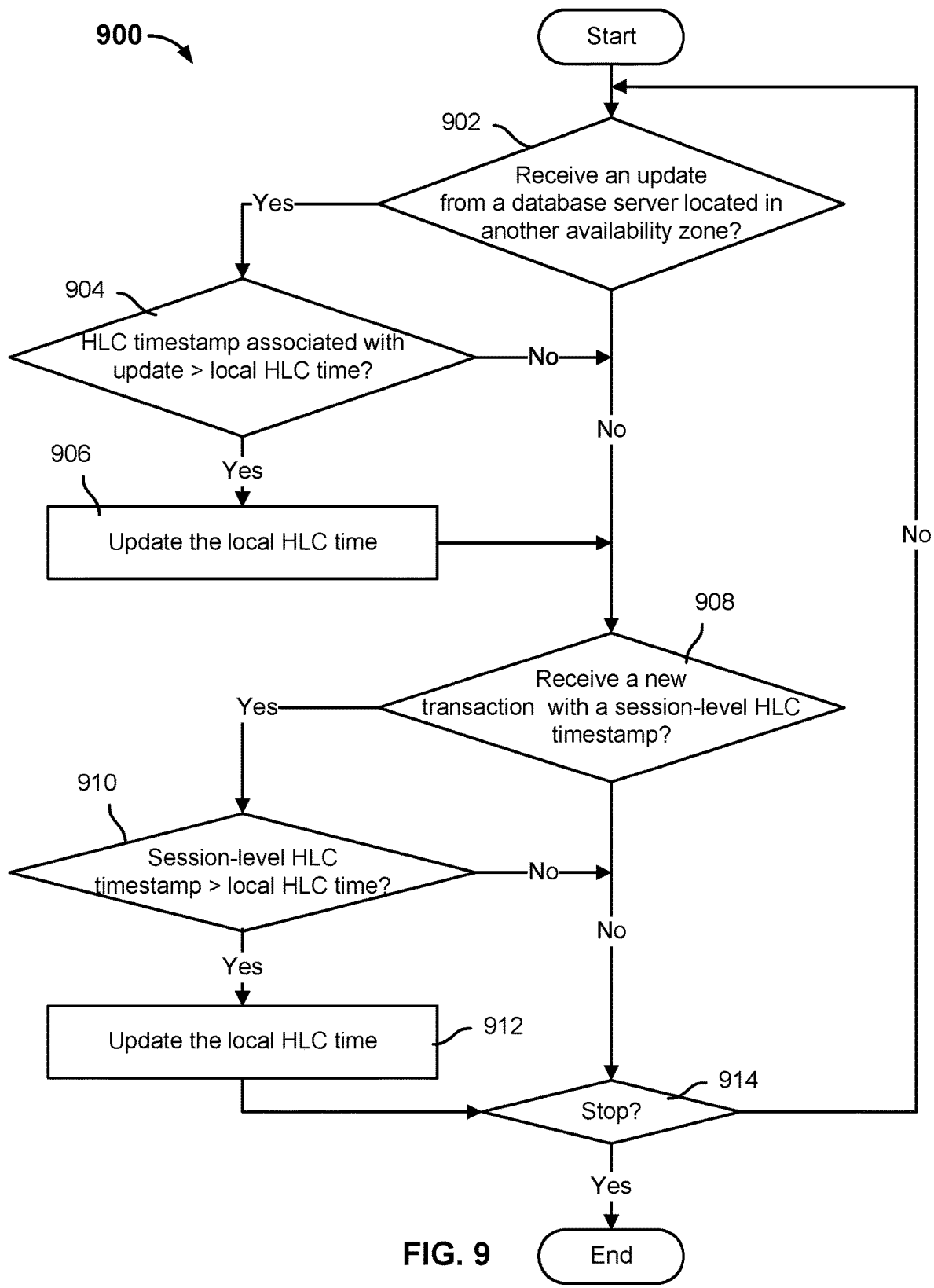
FIG. 9 is a flow diagram showing an example of a process for updating a local HLC based on updates received from sources that are other than from the local availability zone.

FIG. 9 is a flow diagram showing an example of a process for updating a local HLC based on updates received from sources that are other than from the local availability zone. In some embodiments, process 900 may be implemented at any one of database servers DB1, DB2, DB3, and DB4 of system 200 of FIG. 2 regardless if that database server has been selected to serve as a coordinator database server for the transaction.

In various embodiments, for transactions that are performed within only a single availability zone, the logical clock of the HLC that is local to that availability zone serves as a centralized time service, which increases only with the physical clock. However, process 900 describes example events that originate from a source other than the availability zone of the database server on which process 900 is performed, in which that database server is configured to update the HLC of its local availability zone.

At 902, it is determined whether an update is received from a database server located in another availability zone. In the event that such an update is received, control is transferred to 904. Otherwise, in the event that such an update is not received, control is transferred to 908. In some embodiments, an update from a database server that is located in a non-local availability zone (relative to the availability zone in which the database server at which process 900 is performed is located) is an operation result (e.g., value(s) that are read by an execution of a read statement) that includes a timestamp that is obtained from the HLC corresponding to the non-local availability zone. For example, the database server at which process 900 is performed serves as a coordinator database for processing a transaction that includes a statement to read a value that is stored at another database server that is located at a non-local availability zone. In some embodiments, an update from a database server that is located in a non-local availability zone is a commit command with a commit timestamp that is obtained from the HLC corresponding to the non-local availability zone. For example, the database server at which process 900 is performed had executed a statement that is included in a transaction for which the coordinator database server had initiated a two-part commit phase.

At 904, it is determined whether a HLC timestamp associated with the update is greater than a current local HLC time. In the event that the HLC timestamp associated with the update is greater than the current local HLC time, control is transferred to 906. Otherwise, in the event that the HLC timestamp associated with the update is equal to or less than the current local HLC time, control is transferred to 908. The HLC-based timestamp that is associated with the update from the database server located in the non-local availability zone is compared to the current time as indicated by the HLC that is local to the sub-cluster of the availability zone associated with the database at which process 900 is performed.

At 906, the local HLC time is updated. If the HLC-based timestamp of the update is greater than the time of the local HLC, then the local HLC is updated. In some embodiments, the local HLC is updated to match the HLC-based timestamp of the update. In some embodiments, the local HLC is increased by a predetermined interval of physical and/or logical time. For example, the HLC is increased by a value of 1.

At 908, it is determined whether a new transaction with a session-level HLC timestamp is received. In the event that a new transaction is received, control is transferred to 910. Otherwise, in the event that a new transaction is not received, control is transferred to 914. In the event that the database server at which process 900 is performed serves as a coordinator for a transaction, in some instances, a session-level HLC timestamp is maintained by the application from which the transaction originated. In various embodiments, the session-level HLC timestamp is set to either the commit timestamp or the rollback timestamp of the last transaction that was performed in the session.

At 910, it is determined whether the session-level HLC timestamp is greater than the current local HLC time. In the event that the session-level HLC timestamp is greater than the current local HLC time, control is transferred to 912. Otherwise, in the event that the session-level HLC timestamp is equal to or less than the current local HLC time, control is transferred to 914.

At 912, the local HLC time is updated. In some embodiments, the local HLC is updated to match the session-level HLC timestamp. In some embodiments, the local HLC is increased by a predetermined interval of physical and/or logical time. For example, the HLC is increased by a value of 1.

At 914, it is determined whether to stop updating the local HLC. In the event that the local HLC is to stop updating, process 900 ends. Otherwise, in the event that the local HLC is not to stop updating, control returns to 902. For example, the local HLC is to stop updating if the database server at which process 900 is performed loses power.

Figure 10:
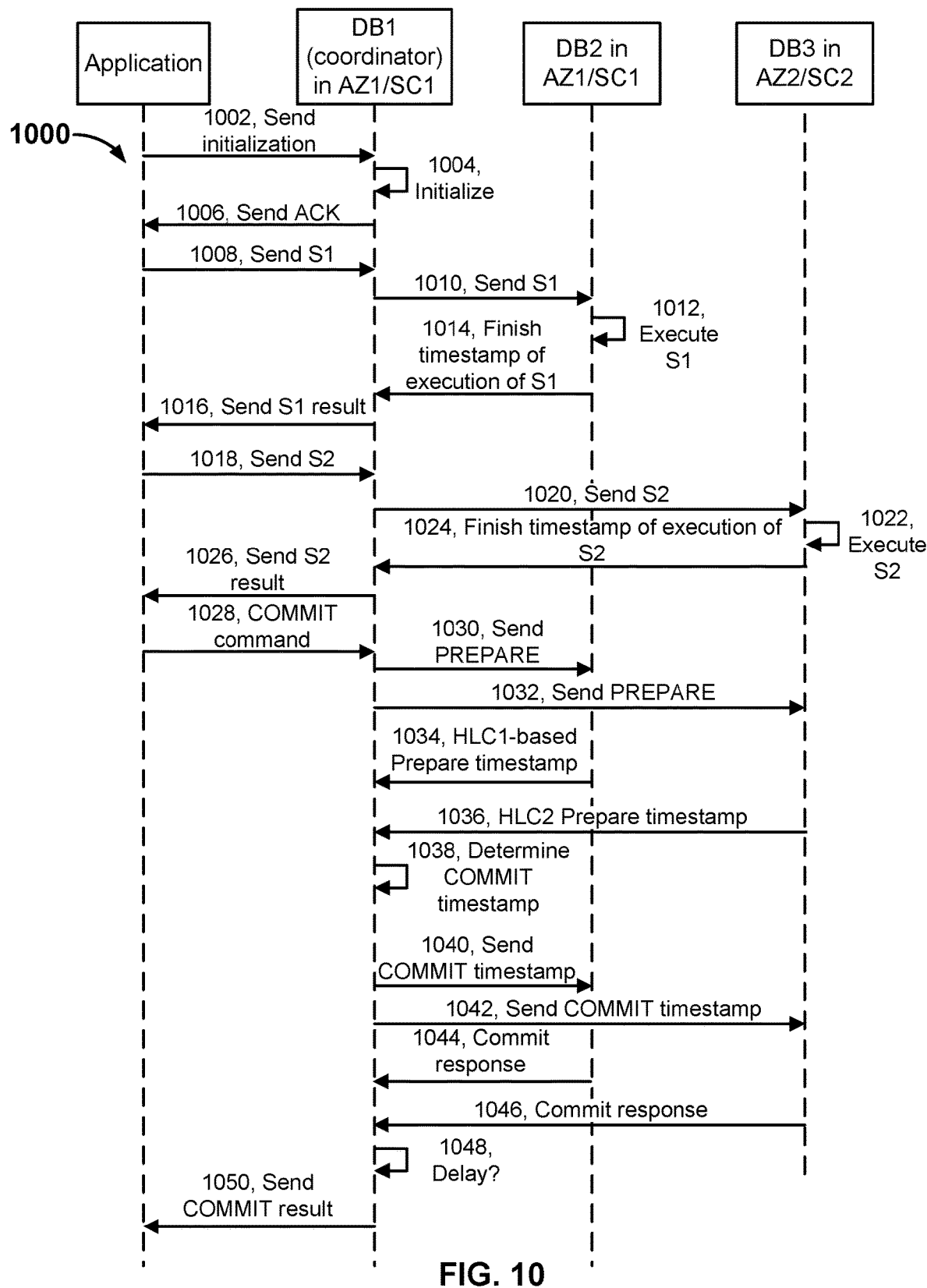
FIG. 10 is a sequence diagram showing an example process of performing transaction processing at a database distributed across a plurality of availability zones.

FIG. 10 is a sequence diagram showing an example process of performing transaction processing at a database distributed across a plurality of availability zones. In the example of the process that is shown in 1000, a transaction is received at system 200 of FIG. 2 where database server DB1 of Sub-Cluster 1 of Availability Zone 1 is selected to serve as the coordinator database. A transaction that includes statements S1 and S2 is received from an application. S1 is to be executed at database server DB2 of Sub-Cluster 1 of Availability Zone 1 (AZ1/SC1) and S2 is to be executed at database server DB3 of Sub-Cluster 2 of Availability Zone 2 (AZ2/SC2), which means that the transaction is a cross-availability zone transaction. Given that the coordinator database server is DB1, which is located in AZ1/SC1, AZ1 may be referred to as the local AZ and HLC1, which is local to AZ1/SC1, may also be referred to as the local HLC.

At 1002, initialization information associated with a transaction is sent from the application to DB1.

At 1004, DB1 performs initialization action(s).

At 1006, DB1 sends an acknowledgment to the application to indicate that initialization has already been performed.

At 1008, statement S1 is sent from the application to DB1.

At 1010, DB1 forwards S1 to DB2.

At 1012, DB1 executes S1 on its local database data.

At 1014, a finish timestamp of execution of statement S1 is sent from DB2 to DB1. DB1 may record this finish timestamp.

At 1016, a result associated with the execution result of S1 is sent from DB1 to the application.

At 1018, statement S2 is sent from the application to DB1.

At 1020, DB1 forwards S2 to DB3.

At 1022, DB3 executes S2 on its local database data.

At 1024, a finish timestamp of execution of statement S2 is sent from DB3 to DB1. DB1 may record this finish timestamp because it is the finish timestamp of the execution of the last statement (S2) that is executed in a non-local availability zone (AZ2).

At 1026, a result associated with the execution result of S2 is sent from DB1 to the application.

At 1028, a commit command is sent from the application to DB1.

At 1030, a prepare command is sent from DB1 to DB2. This is part of the first phase of the two-phase commit protocol that is used to perform a commit when a transaction is performed at multiple database servers.

At 1032, a prepare command is sent from DB1 to DB3. This is part of the first phase of the two-phase commit protocol.

At 1034, a prepare timestamp is sent from DB2 to DB1. This prepare timestamp is derived from HLC1 and is sent with a successful prepare response.

At 1036, a prepare timestamp is sent from DB3 to DB1. This prepare timestamp is derived from HLC2 and is sent with a successful prepare response.

At 1038, DB1 determines a commit timestamp for the transaction by selecting the larger timestamp between the prepare timestamps that are received from DB2 and DB3.

At 1040, a commit command and the commit timestamp are sent by DB1 to DB2.

At 1042, a commit command and the commit timestamp are sent by DB1 to DB3.

At 1044, a commit response is sent from DB2 to DB1.

At 1046, a commit response is sent from DB3 to DB1. After DB1 receives successful commit responses from both participating database servers DB2 and DB3, the transaction is determined to be complete.

At 1048, it is determined whether a time delay is to be applied by DB1. To determine whether to apply a time delay prior to returning the successful commit result to the application, DB1 determines a difference between the finish timestamp of the execution of the last statement (S2) that is executed in a non-local availability zone (AZ2) and the current time that is indicated by the HLC that is local to DB1, which is HLC1. If the difference is equal to or less than a predetermined time skew, then the time delay is waited prior to returning the result at 1050. Otherwise, if the difference is greater than the predetermined time skew, then the time delay is not waited prior to returning the result at 1050.

At 1050, a successful commit result is sent from DB1 to the application.

The following is a new example that describes a scenario in which, due to the clock skew that exists between HLCs of different availability zone sub-clusters, access to the database may lead to inconsistent results:

Assume that a distributed database is set up as shown in FIG. 2. Assume that the record of table tb1 for "Foo" is stored in DB2 (AZ1/SC1) and the record of table tb1 for "Bar" is stored in DB3 (AZ2/SC2).

Assume that transactions Q1 and Q2 are executed at the database in that sequence, where:

Q1 comprises statement S1, which indicates to update table tb1 to set tb1.balance=100 for tb1.name="Foo." S1 is therefore executed at DB2 in AZ1/SC1.

Q2 comprises statement S2, which indicates to update table tb1 to set tb1.balance=200 for tb1.name="Bar." S2 is therefore executed at DB3 in AZ2/SC2.

Even though Q1 was executed before Q2 in absolute time, due to the clock skew that exists between HLC1 of AZ1/SC1 and HLC2 of AZ2/SC2, the database recorded commit timestamp, t1, of Q1 is greater (later) than the database recorded commit timestamp, t2, of Q2. Assume the following:

t1 (the database recorded commit timestamp for Q1)=103
t2 (the database recorded commit timestamp for Q2)=101
tabs1 (the absolute time at which Q1 committed)=1000
tabs2 (the absolute time at which Q2 committed)=1005

To summarize, due to the short period in which transactions Q1 and Q2 were executed at the database and the existence of the clock skew, the sequence of their database recorded commit timestamps (t1 and t2, respectively) is inconsistent with the sequence of their commits in absolute times.

From the perspective of the database, or rather, the commit order of Q1 and Q2 that is honored by the database, Q2 committed before Q1 because t1>t2. However, this database honored commit sequence is inconsistent with Q1 and Q2's commits in absolute time because tabs2>tabs1.

Prior to both Q1 and Q2 committing at the database, correct (relative to the commit timestamps that are honored by the database) reads to the tb1.balance parameter for both tb1.name "Foo" and "Bar" should return one of the following three results: 1) Foo's balance=100 and Bar's balance=200; 2) Foo's balance=old balance value (not 100) and Bar's balance=200; and 3) Foo's balance=old balance value (not 100) and Bar's balance=old balance value (not 200).

However, given the clock skew between HLCs in the sub-clusters of different availability zones, conventionally, an incorrect (relative to the commit timestamps that are honored by the database) read to the tb1.balance parameter for both tb1.name "Foo" and "Bar" could return Foo's balance=100, but Bar's balance's old value (not 200).

An application creates two observers (sessions) and uses the first observer's result to determine the second one's action (i.e., the two observers have a dependent relationship). The following is a consequence of what may conventionally happen if the Q1 and Q2 results are read prior to both transactions committing:

Request: If the first observer sees that Foo's balance=100, then the second observer will increase Bar's balance to 220, if Bar's current balance is 200.

Observer 1 goes to DB2 AZ1/SC1 at absolute time 1001 and it will see that Foo's balance=100, Observer 2 goes to AZ2 at absolute time 1003, it will see Bar's balance at its old value (not 200), then the application will not set Bar's balance to 220.

However, by implementing techniques described herein to each transaction that is performed at the database, the return of the commit result of Observer 1 can be delayed, which would also delay Observer 2 from accessing the database in a way that would enable Observer 2 to view the results of Q2, as desired. After applying the techniques described herein, the two sessions would be performed as follows:

Observer 1 starts transaction A1. A1 executes a statement to select/read the balance from tb1 where name="Foo" and the timestamp at which the statement finish executing are derived from HLC1. Before the commit results of A1 can return, the coordinator database server will check this finish timestamp with local HLC1. If the difference is larger than the predetermined time skew, then it will return immediately. If the difference is equal to or less than the predetermined time skew, then the return is delayed for a period determined based on (e.g., equal to) the predetermined time skew.

After the application receives the commit result return from A1 of Observer 1, it knows Foo's balance is 100. The application then sends transaction A2 through Observer 2 (this is a different session from Observer 1). A2 will execute as follows: select the balance from tb1 where name=Bar and if the balance=200, update the balance to 220. Therefore, Observer 2 receives the read results of Bar's balance and checks if the balance is 200. Now because the delay was applied to returning the results of A1 on which A2 is dependent, A2 will be able to see the commit results of Q2, meaning Bar's balance is 200 and as such, A2 will correctly update Bar's balance to 220.

While techniques are described herein to apply to database servers that are distributed across different availability zones, the same techniques may apply to database servers that are distributed across different regions, providing that the distance between the regions is short such that network latency across different regions is comparable with the maximum clock skew.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A distributed database, comprising:
one or more processors configured to:
determine that a transaction comprising a plurality of statements is to be executed on a plurality of database servers across at least two availability zones, wherein each availability zone is associated with a respective hybrid logical clock (HLC)-based centralized time service;
cause the plurality of statements to execute on the plurality of database servers across the at least two availability zones;
obtain, at a coordinator database server, a plurality of HLC-based prepare timestamps from the plurality of database servers across the at least two availability zones;
select, by the coordinator database server, a maximum HLC-based prepare timestamp to use as a commit timestamp associated with the transaction; and
determine whether the coordinator database server is to return a commit result corresponding to the transaction after a time delay that is determined based at least in part on a predetermined time skew, including to determine whether a difference between the HLC-based finish timestamp associated with the execution of the last statement of the plurality of statements and a current local HLC time relative to the coordinator database server is equal to or less than the predetermined time skew, wherein the last statement of the plurality of statements is executed at a first availability zone that is different from a second availability zone in which the coordinator database server is located; and
one or more memories coupled to the one or more processors and configured to provide instructions to the one or more processors.

2. The distributed database of claim 1, wherein to determine whether to return the commit result corresponding to the transaction after the time delay is determined based at least in part on the predetermined time skew comprises to:
in response to a determination that the difference is equal to or less than the predetermined time skew, return, from the coordinator database server, the commit result corresponding to the transaction after the time delay.

3. The distributed database of claim 1, wherein the one or more processors are configured to cause the plurality of database servers across the at least two availability zones to commit execution results associated with the plurality of statements using the commit timestamp.

4. The distributed database of claim 1, wherein the one or more processors are further configured to obtain locks for data affected by the plurality of statements at the plurality of database servers.

5. The distributed database of claim 1, wherein the one or more processors are further configured to send a prepare command to the plurality of database servers.

6. The distributed database of claim 1, wherein the one or more processors are configured to release locks on data affected by the plurality of statements at the plurality of database servers.

7. The distributed database of claim 1, wherein the predetermined time skew is determined based at least in part on a maximum clock skew between a plurality of HLCs corresponding to the at least two availability zones.

8. The distributed database of claim 1, wherein the time delay is equivalent to the predetermined time skew.

9. The distributed database of claim 1, wherein the current local HLC time comprises a first current local HLC, and wherein the one or more processors are further configured to:
receive an update from a database server located in a third availability zone that is different from the second availability zone in which the coordinator database server is located;
compare an HLC-based timestamp associated with the update to a second current local HLC time; and
in response to a determination that the HLC-based timestamp associated with the update is greater than the second current local HLC time, update the second current local HLC time.

10. The distributed database of claim 1, wherein the current local HLC time comprises a first current local HLC, and wherein the one or more processors are further configured to:
receive a session-level HLC timestamp with the transaction;
compare the session-level HLC timestamp to a second current local HLC time; and
in response to a determination that the session-level HLC timestamp is greater than the second current local HLC time, update the second current local HLC time.

11. A method, comprising:
determining that a transaction comprising a plurality of statements is to be executed on a plurality of database servers across at least two availability zones, wherein each availability zone is associated with a respective hybrid logical clock (HLC)-based centralized time service;
causing the plurality of statements to execute on the plurality of database servers across the at least two availability zones;
obtaining, at a coordinator database server, a plurality of HLC-based prepare timestamps from the plurality of database servers across the at least two availability zones;
selecting, by the coordinator database server, a maximum HLC-based prepare timestamp to use as a commit timestamp associated with the transaction; and
determining whether the coordinator database server is to return a commit result corresponding to the transaction after a time delay that is determined based at least in part on a predetermined time skew, including determining whether a difference between the HLC-based finish timestamp associated with the execution of the last statement of the plurality of statements and a current local HLC time relative to the coordinator database server is equal to or less than the predetermined time skew, wherein the last statement of the plurality of statements is executed at a first availability zone that is different from a second availability zone in which the coordinator database server is located.

12. The method of claim 11, wherein determining whether to return the commit result corresponding to the transaction after the time delay is determined based at least in part on the predetermined time skew comprises:
  in response to a determination that the difference is equal to or less than the predetermined time skew, returning, from the coordinator database server, the commit result corresponding to the transaction after the time delay.

13. The method of claim 11, further comprising obtaining locks for data affected by the plurality of statements at the plurality of database servers.

14. The method of claim 11, further comprising sending a prepare command to the plurality of database servers.

15. The method of claim 11, further comprising releasing locks on data affected by the plurality of statements at the plurality of database servers.

16. The method of claim 11, wherein the predetermined time skew is determined based at least in part on a maximum clock skew between a plurality of HLCs corresponding to the at least two availability zones.

17. A computer program product, the computer program product being embodied in a non-transitory computer readable storage medium and comprising computer instructions for:
  determining that a transaction comprising a plurality of statements is to be executed on a plurality of database servers across at least two availability zones, wherein each availability zone is associated with a respective hybrid logical clock (HLC)-based centralized time service;
  causing the plurality of statements to execute on the plurality of database servers across the at least two availability zones;
  obtaining, at a coordinator database server, a plurality of HLC-based prepare timestamps from the plurality of database servers across the at least two availability zones;
  selecting, by the coordinator database server, a maximum HLC-based prepare timestamp to use as a commit timestamp associated with the transaction; and
  determining whether the coordinator database server is to return a commit result corresponding to the transaction after a time delay that is determined based at least in part on a predetermined time skew, including determining whether a difference between the HLC-based finish timestamp associated with the execution of the last statement of the plurality of statements and a current local HLC time relative to the coordinator database server is equal to or less than the predetermined time skew, wherein the last statement of the plurality of statements is executed at a first availability zone that is different from a second availability zone in which the coordinator database server is located.

* * * * *

UNITED STATES PATENT AND TRADEMARK OFFICE
CERTIFICATE OF CORRECTION

PATENT NO. : 11,436,218 B2
APPLICATION NO. : 16/530350
DATED : September 6, 2022
INVENTOR(S) : Le Cai, Xin Jia and Qinyi Wu It is certified that error appears in the above-identified patent and that said Letters Patent is hereby corrected as shown below:

In the Specification

In Column 1, Line(s) 42, delete "a HLC" and insert --an HLC--, therefore.
In Column 3, Line(s) 55, delete "a HLC" and insert --an HLC--, therefore.
In Column 3, Line(s) 58, delete "a HLC" and insert --an HLC--, therefore.
In Column 5, Line(s) 21, delete "a HLC" and insert --an HLC--, therefore.
In Column 8, Line(s) 53, delete "a HLC" and insert --an HLC--, therefore.
In Column 12, Line(s) 8, delete "a HLC" and insert --an HLC--, therefore.
In Column 12, Line(s) 28, delete "a HLC" and insert --an HLC--, therefore.
In Column 12, Line(s) 31, delete "a HLC" and insert --an HLC--, therefore.
In Column 12, Line(s) 48, delete "a HLC" and insert --an HLC--, therefore.
In Column 15, Line(s) 40, delete "a HLC" and insert --an HLC--, therefore.
In Column 16, Line(s) 32, delete "a HLC" and insert --an HLC--, therefore.
In Column 18, Line(s) 10, delete "than" and insert --then--, therefore.
In Column 21, Line(s) 37, delete "a HLC" and insert --an HLC--, therefore.

Signed and Sealed this
Fourteenth Day of March, 2023

Katherine Kelly Vidal
*Director of the United States Patent and Trademark Office*